(12) United States Patent
Gressel et al.

(10) Patent No.: US 12,468,994 B2
(45) Date of Patent: Nov. 11, 2025

(54) OPTIMAL MERCHANDISE SELECTION AND MERCHANDISING DESIGN DISPLAY METHODS AND SYSTEMS

(71) Applicant: THE HERSHEY COMPANY, Hershey, PA (US)

(72) Inventors: Greg Gressel, Hershey, PA (US); Eric Lawrence, Hershey, PA (US)

(73) Assignee: THE HERSHEY COMPANY, Hershey, PA (US)

( * ) Notice: Subject to any disclaimer, the term of this patent is extended or adjusted under 35 U.S.C. 154(b) by 253 days.

(21) Appl. No.: 18/313,643

(22) Filed: May 8, 2023

(65) Prior Publication Data

US 2023/0359966 A1    Nov. 9, 2023

Related U.S. Application Data

(63) Continuation of application No. 16/877,422, filed on May 18, 2020, now Pat. No. 11,687,857.

(60) Provisional application No. 62/849,243, filed on May 17, 2019.

(51) Int. Cl.
| | |
|---|---|
| *G06Q 10/0631* | (2023.01) |
| *A47F 3/00* | (2006.01) |
| *B65D 5/52* | (2006.01) |
| *G06F 30/10* | (2020.01) |
| *G06Q 10/0832* | (2023.01) |
| *G06Q 10/0875* | (2023.01) |
| *G06Q 20/20* | (2012.01) |
| *G06Q 30/0204* | (2023.01) |

(Continued)

(52) U.S. Cl.
CPC ....... *G06Q 10/06315* (2013.01); *A47F 3/004* (2013.01); *B65D 5/52* (2013.01); *G06F 30/10* (2020.01); *G06Q 10/0832* (2013.01); *G06Q 10/0875* (2013.01); *G06Q 20/20* (2013.01); *G06Q 30/0205* (2013.01); *G06Q 30/0621* (2013.01); *G06Q 30/0633* (2013.01); *G06Q 50/04* (2013.01)

(58) Field of Classification Search
CPC .. A47F 3/004; A47F 5/11; A47F 5/112; A47F 5/114; B65D 5/52; B65D 5/522; B65D 5/5226
See application file for complete search history.

(56) References Cited

U.S. PATENT DOCUMENTS

| | | | |
|---|---|---|---|
| 3,664,494 A * | 5/1972 | Mergens | ............... B65D 5/4608 229/164 |
| 6,068,139 A | 5/2000 | Brozak, Jr. | |

(Continued)

OTHER PUBLICATIONS

Timonina-Farkas et al., "Product assortment and space allocation strategies to attract loyal and non-loyal customer," College of Management of Technology, European Journal of Operational Research, available online Feb. 19, 2020.

(Continued)

*Primary Examiner* — Daniel J Rohrhoff
(74) *Attorney, Agent, or Firm* — Jordan IP Law, LLC

(57) ABSTRACT

The novel invention provides methods and systems for automated production of merchandising displays. The displays can be assembled in whole, shipped in whole and filled with customer-selected products in customer-selected amounts, filled with criteria-selected products in criteria-selected amounts or both.

7 Claims, 16 Drawing Sheets

(51) Int. Cl.
*G06Q 30/0601* (2023.01)
*G06Q 50/04* (2012.01)

(56) References Cited

U.S. PATENT DOCUMENTS

| | | | | |
|---|---|---|---|---|
| 6,135,289 | A * | 10/2000 | Miller | B65D 5/5088 |
| | | | | 206/774 |
| 6,547,084 | B2 | 4/2003 | Bauman et al. | |
| 6,557,708 | B2 * | 5/2003 | Polacco | B65D 5/5445 |
| | | | | 206/774 |
| 6,785,805 | B1 | 8/2004 | House et al. | |
| 6,959,284 | B1 | 10/2005 | Howes | |
| 9,475,608 | B2 * | 10/2016 | Dye | B65D 77/0413 |
| 9,994,356 | B2 * | 6/2018 | Couture | B31B 50/48 |
| 10,463,176 | B1 * | 11/2019 | Sells | A47F 5/114 |
| 2003/0038099 | A1 | 2/2003 | Bauman et al. | |
| 2003/0105542 | A1 | 6/2003 | Amold et al. | |
| 2003/0215357 | A1 | 11/2003 | Malterer et al. | |
| 2006/0108301 | A1 | 5/2006 | Polvere et al. | |
| 2009/0125875 | A1 | 5/2009 | Schmitter et al. | |
| 2010/0012600 | A1 | 1/2010 | Clontz et al. | |
| 2014/0121820 | A1 | 5/2014 | Das et al. | |
| 2015/0144525 | A1 * | 5/2015 | Luke | A47F 5/116 |
| | | | | 206/774 |
| 2015/0210424 | A1 * | 7/2015 | Bevier | B65D 5/726 |
| | | | | 206/774 |
| 2018/0075506 | A1 | 3/2018 | Burkhard et al. | |
| 2018/0247261 | A1 | 8/2018 | Smith et al. | |
| 2019/0276241 | A1 | 9/2019 | Royce et al. | |
| 2022/0330724 | A1 * | 10/2022 | Chow | B65D 5/52 |
| 2023/0015902 | A1 * | 1/2023 | Lopez Uran | A47F 5/10 |
| 2024/0083622 | A1 * | 3/2024 | Smith | B65D 5/6602 |

OTHER PUBLICATIONS

Garrido-Morgado et al., "Merchandising at the point of sale: differential effect of end of aisle and islands," University of Salamanca, Spain, Business Research Quarterly, Elsevier Doyma, available online Apr. 29, 2014.

* cited by examiner

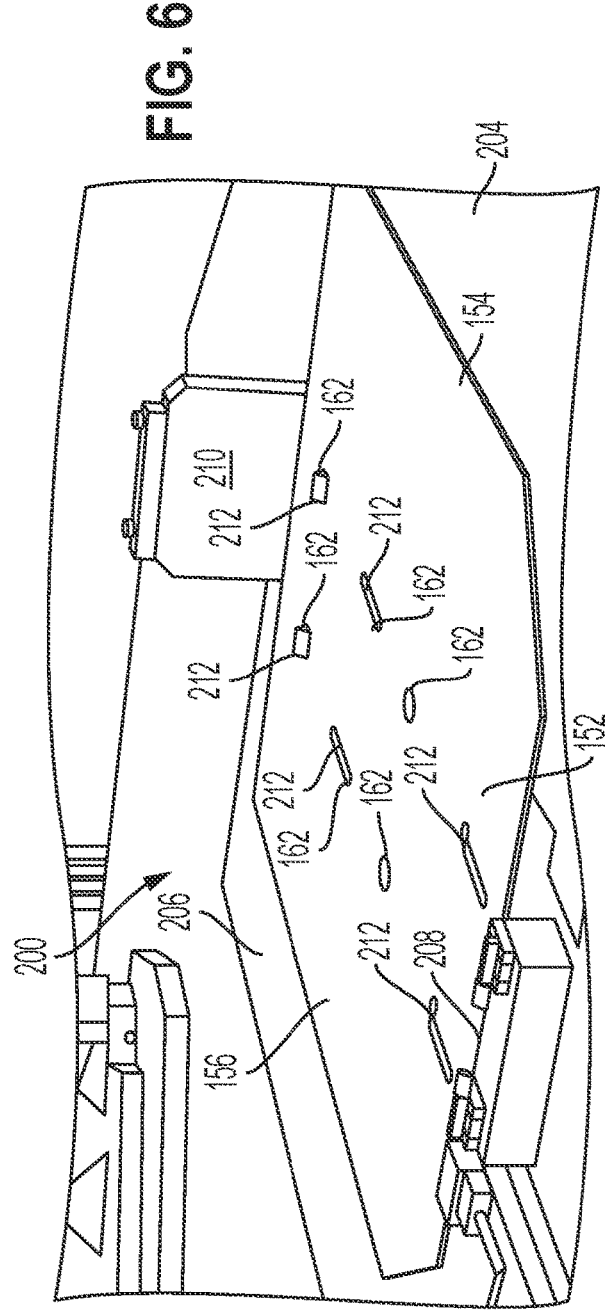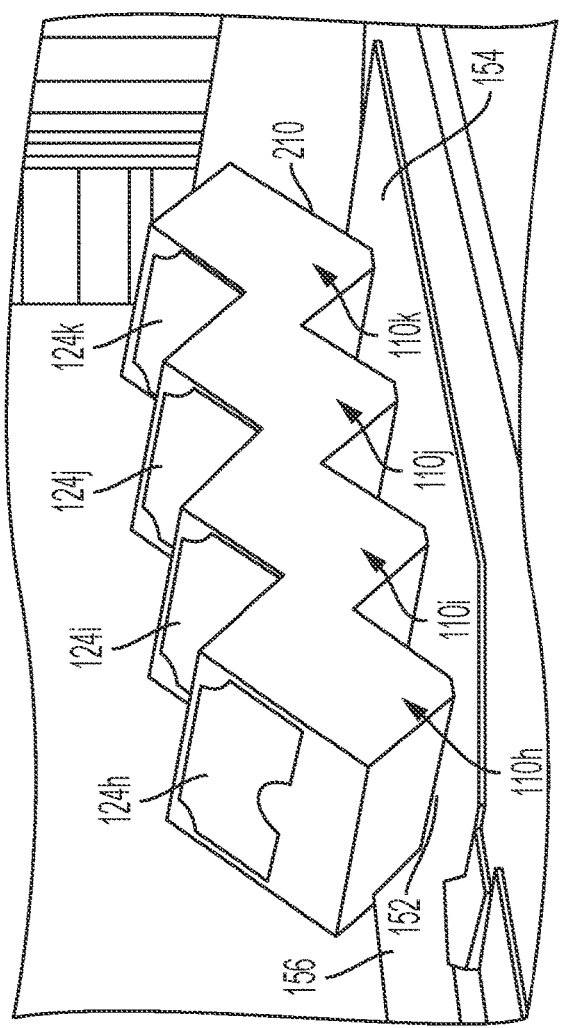

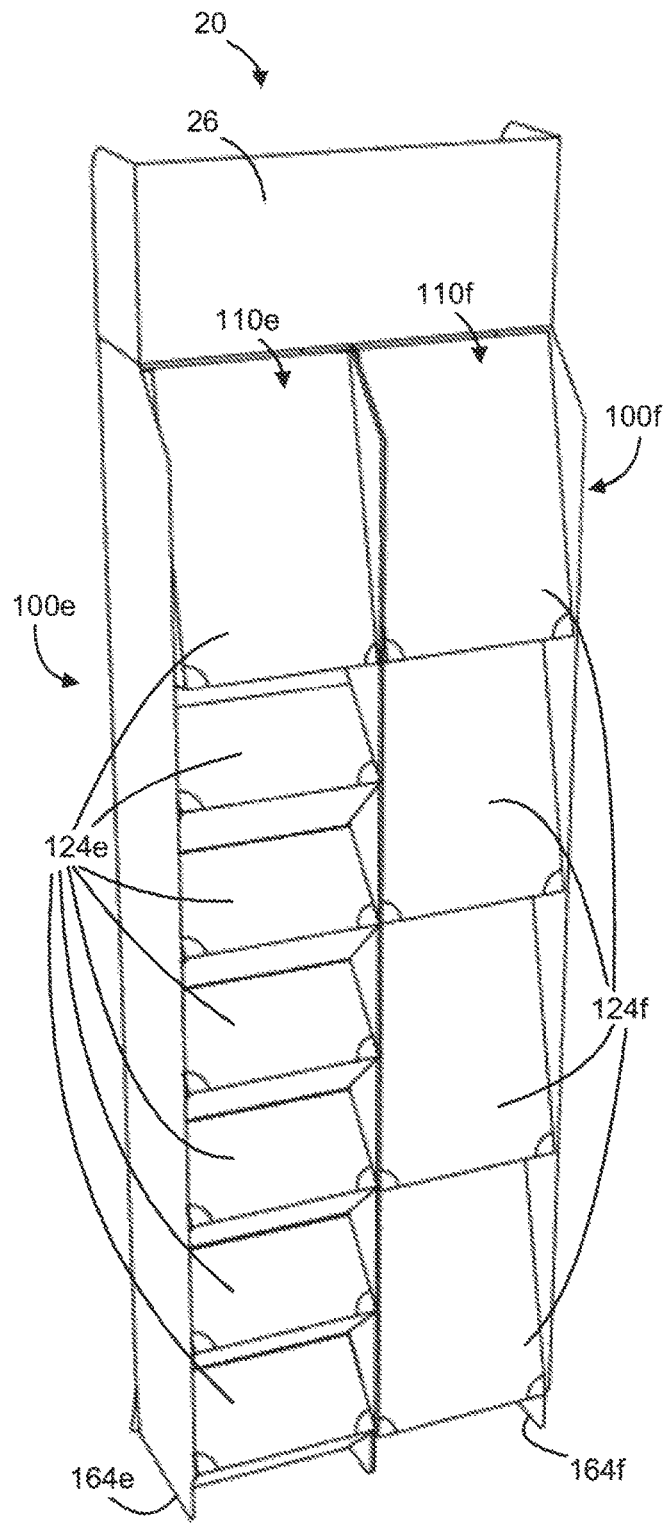
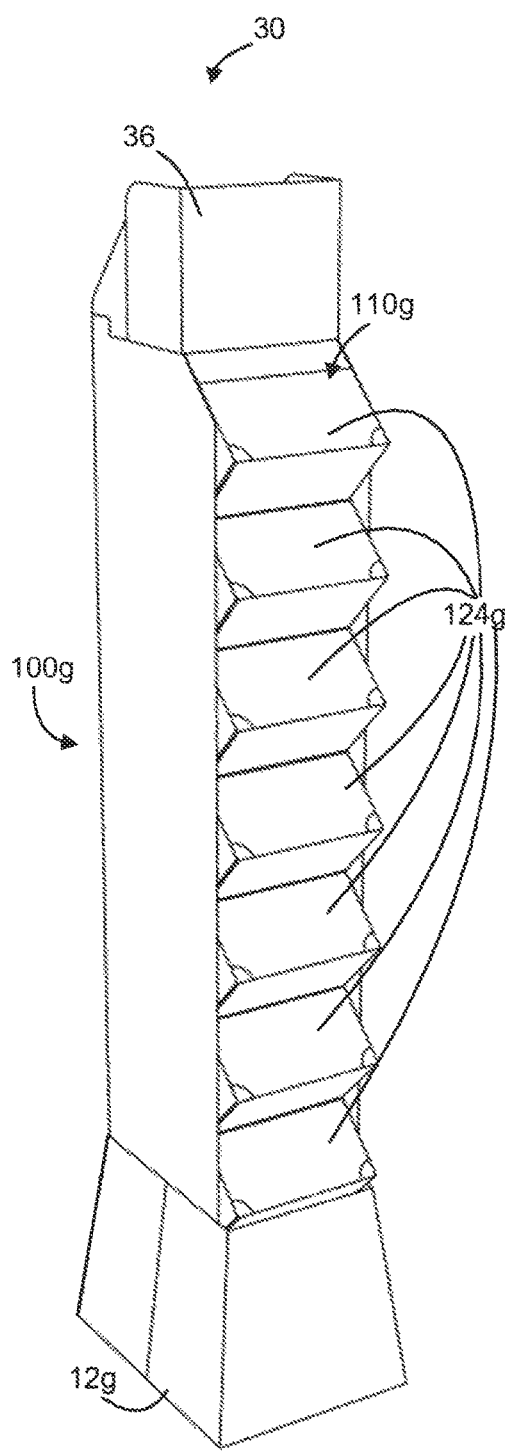
FIG. 15A
FIG. 15B

OPTIMAL MERCHANDISE SELECTION AND MERCHANDISING DESIGN DISPLAY METHODS AND SYSTEMS

CROSS REFERENCE TO RELATED APPLICATIONS

This application is a Continuation of U.S. patent application Ser. No. 16/877,422 filed May 18, 2020, which claims the benefit of and priority to U.S. Provisional Patent Application No. 62/849,243, filed on May 17, 2019, the contents of which are incorporated by reference in their entirety.

FIELD OF THE INVENTION

The novel invention provides methods and systems for automated production of merchandising displays. The displays can be assembled in whole, shipped in whole and filled with customer-selected or customer-predicated products in customer-selected amounts, filled with criteria-selected products in criteria-selected or customer-predicted amounts or both.

BACKGROUND OF THE INVENTION

For thousands of years and since the age of antiquity, shopkeepers have laid bare their wares for sale to entice actual and would-be buyers to partake thereof. They've used experience, trial and error, and the seasons to determine which goods to display and sell at which time. From ancient times until now, most such sales have been intuitive even as high level sales became more and more data driven.

As the sale of goods advanced, sellers sought better and better ways to present their goods for sale based upon what they know and understand about the people who purchase from them. Eventually, such understanding has formed the basis of product packaging and all of its attendant disciplines.

Though product packaging and product selection have advanced greatly in the modern era, it is often still more art than science. Because of this, optimization of product selection and presentation (i.e., packaging) from manufacturer to seller often lacks logical consistency, repeatability, automation and efficiency (e.g., cost, labor, time, and material).

What is therefore needed is an integrative method and system that enables customer selection of both merchandise and display and/or enables predictive merchandise selection and display creation, automatically, based upon various kinds of data.

The enclosed invention rectifies all of the above issues and more. It provides a consistent, repeatable, semi-automated or automated and efficient method and system to create merchandise filled displays specific to the needs and/or requests of sellers.

SUMMARY OF THE INVENTION

Accordingly, the invention provides, in one embodiment herein, an automated or semi-automated method of assembling a customer-selected merchandising display for selling goods within a venue, e.g., a store. The steps of the method comprise, at least in part, receiving an order from a venue or store; constructing at least two customizable cartridges for the order; assigning at least two types of suitable merchandise to each cartridge specific to the order; designing the customer-selected merchandising display; assembling at least two cartridges into the customer-selected merchandising display; and shipping the customer-selected merchandising display intact to the venue.

It is particularly pointed out that the assigning of at least two types of suitable merchandise to each cartridge and designing the customer-selected merchandising display is optimized, preferably, for both the quantity and kind of merchandise selected and for the geometric design of the merchandising display that holds the merchandise. Also preferably, the optimization thereof occurs due to an automated, algorithm-empowered method and/or system.

The automated method of assembling a customer-selected merchandising display may further comprise the step of scheduling delivery of the customer-selected merchandising display. Such delivery is preferably automated and tied to past recent sales and/or seasonal data. The delivery can be hard set for a specific chosen day or made flexible based upon sales velocity in a store with a prediction algorithm that predicts the best day to ship for the optimal date of delivery.

In a most preferred practice herein, the customer-selected merchandising display is a stand alone display. The stand alone display, once constructed, can be shipped to a venue and placed upright therein in any suitable location thereof. It is specifically constructed and designed by automation or semi-automation to occupy floor space without taking away precious shelf space. There is a configuration of the invention, however, in which the display can also occupy store shelves if desired.

The automated method of assembling a customer-selected merchandising display wherein the customer-selected merchandising display contains between about two to about one-hundred cartridges. The customer-selected merchandising display herein will be built according to the requests and requirements of the customer which can be one or many venues. Once constructed, the assembled customer-selected merchandising display is transportable in whole after assembly.

In the automated method of assembling a customer-selected merchandising display, at least two types of suitable merchandise are assigned to each cartridge by selective algorithm. The algorithm selects merchandise for placement based upon request of a customer, customer sales data, regional sales data, demographic data, seasonal sales data, logic-based anticipation of most saleable merchandise, raw material sourcing and more. Selected merchandise can be at least two or more, pre-packaged and of many types. In fact, the merchandise selection algorithm can assign a score to selected merchandise thereby providing an operator a choice of which merchandise to select given the score.

The scoring criteria for merchandise herein is creatable by one who uses the described methods and systems herein. Such criteria is particularized based upon the kind of merchandise being scored. A person of skill in the area of a subject merchandise type, will know which criteria should be included, how criteria is to be weighted and ultimately what a score for subject merchandise means.

Also in the automated method of assembling a customer-selected merchandising display, the customer-selected merchandising display is designed by a display construction algorithm to produce an optimal geometric configuration thereof. This is important because the construction algorithm provides for optimal use of floor space; optimal visual appeal; optimized shipping cost savings and material use benefits. The display construction algorithm measures the amount of merchandise used, the number of cartridges projected and then digitally builds the merchandising display for later, preferably, automated construction or semi-automated construction upon a robotic assembly line.

The display construction algorithm herein designs the customer-selected merchandising display based upon factors including but not limited to decreased packaging costs, decreased labor costs, increased pallet density, decreased transportation costs, decreased printing costs, floor square footage, and optical display geometry. The display construction algorithm uses all of these factors and more to properly design and then later cause to be built a stand-alone display that is also filled with merchandise optimized for kind and quantity.

In practice, at least two customer-selected merchandising displays placed and connected together form a point of sale unit. A point of sale unit herein may comprise from between about two to about twelve customer-selected merchandising displays. The point of sale unit may be shipped as a whole unit for later display in a store or other kind of venue for sale. The point of sale unit, once fully constructed, contains all or substantially all of the identifying information, branding material, and merchandise content information necessary for its display in a store.

In another embodiment herein, the invention provides an automated method of assembling a customer-predicting merchandising display for selling goods. The steps of the method comprise, at least in part, designing a customized order based upon fore known criteria; constructing at least two customizable cartridges (or cartridge) for the order; assigning at least two types of suitable merchandise to each cartridge specific to the order; designing the customer-predicting merchandising display; assembling at least two cartridges into the customer-predicting merchandising display; and shipping the customer-predicting merchandising display intact to the venue.

It is particularly pointed out that the assigning of at least two types of suitable merchandise to each cartridge and designing the customer-predicting merchandising display is optimized, preferably, for both the quantity and kind of merchandise selected and for the geometric design of the merchandising display that holds the merchandise. Also preferably, the optimization thereof occurs due to an automated, algorithm-empowered method and system.

The automated method of assembling a customer-predicting merchandising display, preferably, further comprises the step of scheduling delivery of the customer-predicting merchandising display. The delivery can be hard set for a specific chosen day or made flexible based upon sales velocity in a store with a prediction algorithm that predicts the best day to ship for the optimal date of delivery.

In a most preferred practice herein, the customer-predicting merchandising display is a stand alone display. The stand alone display, once constructed, can be shipped to a venue or store and placed upright therein in any suitable location of the venue. It is specifically constructed and designed by automation to occupy floor space without taking away precious shelf space. There is a configuration of the invention, however, in which the display can also occupy store shelves if desired.

The automated method of assembling a customer-predicting merchandising display wherein the customer-predicting merchandising display contains between about two to about one-hundred said cartridges. The customer-predicting merchandising display is built according to the requests and requirements of the customer which can be one or many venues. Once constructed, the assembled customer-predicting merchandising display is transportable in whole after assembly.

In the automated method of assembling a customer-predicting merchandising display, at least two types of suitable merchandise are assigned to each cartridge by predictive algorithm. The algorithm selects merchandise for placement based upon at least one of the following: past sales data, seasonal velocity data, non-seasonal velocity data, geography, demographics, raw material sourcing and more. Additional criteria may also be used within the predictive algorithm. Selected merchandise can be at least two or more, pre-packaged and of many types. In fact, the predictive algorithm can assign a score to eligible merchandise thereby providing an operator a choice of which merchandise to select given the score.

The scoring criteria for merchandise herein is creatable by one who uses the described methods and systems herein. Such criteria is particularized based upon the kind of merchandise being scored. A person of skill in the area of a subject merchandise type, will know which criteria should be included, how criteria is to be weighted and ultimately what a score for subject merchandise means.

Also in the automated method of assembling a customer-predicting merchandising display, the customer-predicting merchandising display is designed by a display construction algorithm to produce an optimal geometric configuration. The display construction algorithm measures the amount of merchandise used, the number of cartridges projected and then digitally builds the merchandising display for later automated construction upon, preferably, a robotic assembly line.

The display construction algorithm herein designs the customer-predicting merchandising display based upon factors including but not limited to decreased packaging costs, decreased labor costs, increased pallet density, decreased transportation costs, decreased printing costs and more. The display construction algorithm uses all of these factors and more to properly design and then later cause to be built a stand-alone display that is also filled with the optimal kind and quantity of merchandise for the display.

In practice, at least two customer-predicting merchandising displays placed and connected together form a point of sale unit. A point of sale unit herein may comprise from between about two to about twelve customer-predicting merchandising displays. The point of sale unit may be shipped as a whole unit for later display in a store or other kind of venue for sale. The point of sale unit, once fully constructed, contains all or substantially all of the identifying information, branding material, and merchandise content information necessary for its display in a store.

Another embodiment of the invention herein provides for a system of creating customer-selected merchandising displays for selling merchandise (also, goods). The system comprises a merchandise ordering system; a goods receiving system; a cartridge construction system; a merchandise decision system for filling each cartridge; a merchandising display design system for precisely designing the merchandising display; a merchandising display assembly system for assembling at least two cartridges herein and placing them into a merchandising display; and a shipping system for shipping the merchandising display intact to a venue.

Yet another embodiment of the invention herein provides a system of assembling a customer-predicting merchandisable display for selling goods. The system comprises a merchandise ordering system based upon foreknown criteria and data; a goods receiving system; a cartridge construction system; a merchandise decision system for filling each cartridge; a merchandising display design system for precisely designing merchandising display; a merchandising display assembly system for assembling at least two cartridges into a merchandising display; and a shipping system for shipping the merchandising display intact to a venue.

BRIEF DESCRIPTION OF THE FIGURES

The various exemplary embodiments of the present invention, which will become more apparent as the description proceeds, are described in the following detailed description in conjunction with the accompanying drawings, in which:

FIG. 6 is a perspective view of the wrap shown in FIG. 4 disposed on the jig shown in FIG. 5;

FIG. 7 is the view of FIG. 6 with a plurality of cartons positioned on the wrap and the jig;

FIGS. 15A and 15B are perspective views of additional free-standing modular displays having display towers constructed in accordance with an embodiment of the present invention.

DETAILED DESCRIPTION OF THE INVENTION

Figure 1:
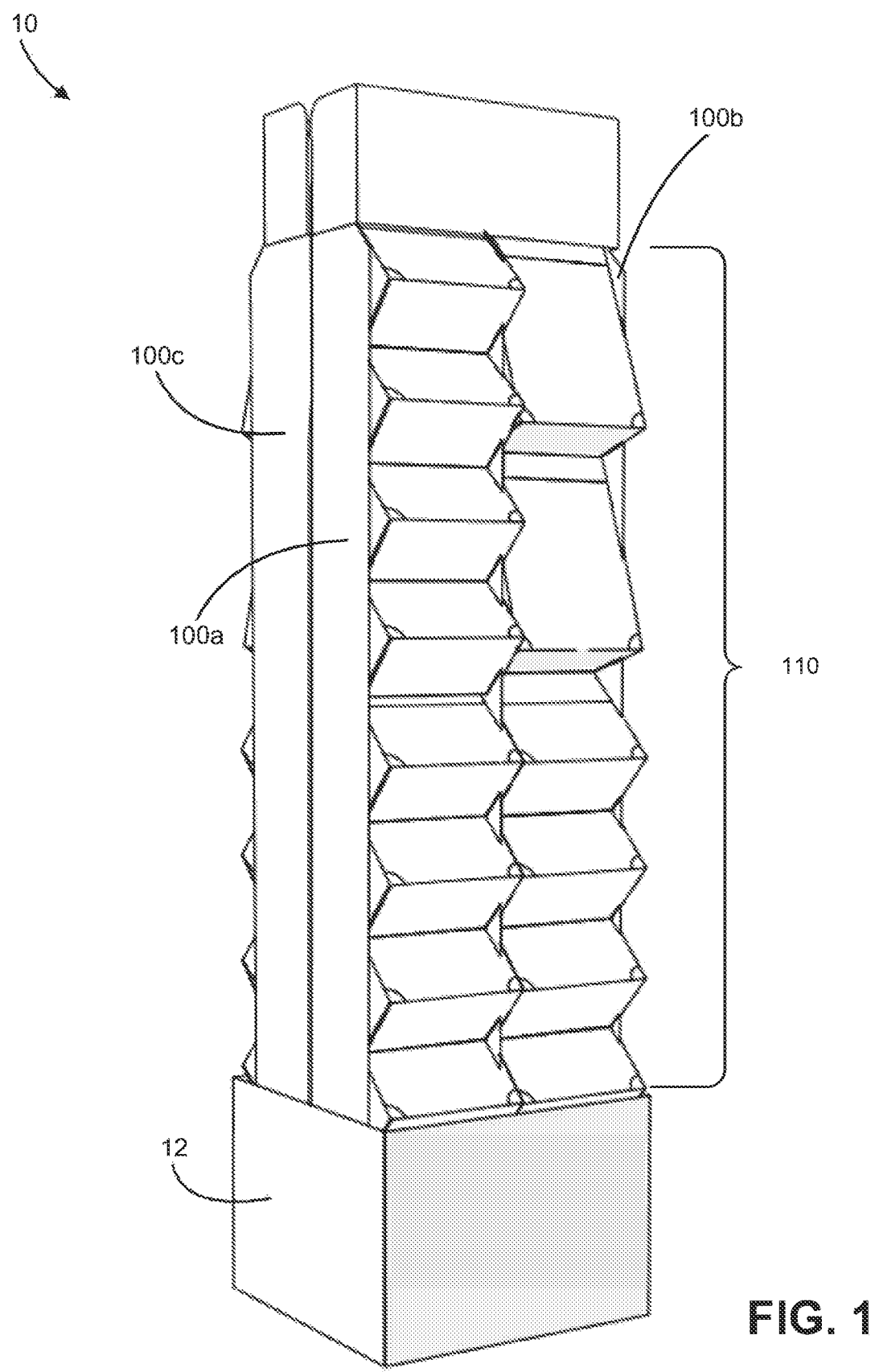
FIG. 1 is a perspective view of a free-standing modular display having display towers constructed in accordance with an embodiment of the present invention.

By the term "customer-selected merchandising display for selling goods" it is meant herein a merchandise-filled display built by the invention herein through customer selection of desired merchandise.

By the term "customer-predicting merchandising display for selling goods" it is meant herein a merchandise-filled display built by an embodiment of the invention herein through a customer predictive model of merchandising needs of a venue.

By the term "customizable cartridge or customizable cartridges" it is meant herein a unit housing at least one and preferably two or more kinds of merchandise for sale or display in a store or venue.

By the term "stand alone display" it is meant herein a corrugated display for merchandise herein that stands upright by its own power due to its structure.

By the term "automation" or "automated" it is meant herein a process or system which is fully automated or substantially fully automated for the production of merchandising displays herein.

By the term "semi-automation" or "semi-automated" it is meant herein a process or system which is at least partially automated for the production of merchandising displays herein.

By the term "re-fill order" it is meant herein an initial order or a re-order of merchandise specified for a merchandise-filled display herein.

By the term "optimal merchandise" it is meant herein the best selected identity and amount of merchandise to be included within a merchandising display.

By the term "optimal geometric configuration" of a display it is meant herein a display that has been optimally geometrically configured for sell of the merchandise that it carries.

By the term "point of sale unit" it means a whole, stand-alone display from which merchandise is placed on sale and may be selected by a user for final purchase at an in-store register or other point of sale device.

By the term "customer sales data" it is meant herein sales data specific to a customer.

By the term "regional sales data" it is meant herein sales data specific to a region and that is not customer specific.

By the term "seasonal sales data" it is meant herein sales data specific to a specific season in the year, e.g., Christmas, Easter, Memorial Day and the like.

The invention herein provides systems, methods and multiple embodiments thereof, in one embodiment herein, an automated method of assembling a customer-selected merchandising display for selling goods within a venue. The steps of the method comprise, at least in part, receiving an order from a venue; constructing at least two customizable cartridges (or cartridge) for the order; assigning at least two types of suitable merchandise to each cartridge specific to the order; designing the customer-selected merchandising display; assembling at least two cartridges into the customer-selected merchandising display; and shipping the customer-selected merchandising display intact to the venue. The automated method of assembling a customer-selected merchandising display further comprises the step of scheduling delivery of the customer-selected merchandising display.

The resulting displays from the systems and methods herein are ideally suitable for the counting, placement, storage, transport and display of packaged candy and other confectionary items together referred to herein as "packaged goods". In the systems and methods herein, the weight, structure and geometry of packaged goods are well known and accounted for in the building of the stand-alone displays herein. In fact, the stand alone displays are constructed based upon the above stated characteristics of the packaged goods.

The characteristics of the packaged goods are accounted for as known constants within the algorithms for selection of the packaged goods and the algorithms for building the stand alone displays.

In a most preferred practice herein, the customer-selected merchandising display is a stand alone display. The stand alone display, once constructed, can be shipped to a venue or store and placed upright therein in any suitable location of the venue. It is specifically preferably constructed and designed by automation to occupy floor space without taking away precious self space.

The automated method of assembling a customer-selected merchandising display wherein the customer-selected merchandising display contains between about two to about one-hundred cartridges. The customer-selected merchandising display will be built according to the requests and requirements of the customer which can be one venue or store or many stores. Once constructed, the assembled customer-selected merchandising display is transportable in whole after assembly.

In the automated method of assembling a customer-selected merchandising display, at least two types of suitable merchandise is assigned to each cartridge by selective algorithm. The algorithm selects merchandise for placement based upon request of a customer, sales data, demographic data, seasonal data and logic-based anticipation of most saleable merchandise. Selected merchandise can be at least two or more, pre-packaged and of many types.

Also in the automated method of assembling a customer-selected merchandising display, the customer-selected merchandising display is designed by a display construction algorithm to produce an optimal geometric configuration. The display construction algorithm measures the amount of merchandise used, the number of cartridges projected and then digitally builds the merchandising display for later automated construction upon, preferably, a robotic assembly line.

The display construction algorithm herein designs the customer-selected merchandising display based upon factors including but not limited to decreased packaging costs, decreased labor costs, increased pallet density, decreased transportation costs, and decreased printing costs. The display construction algorithm uses all of these factors and more to properly design and then later cause to be built a stand-alone display that is also filled with optimal merchandise. The algorithm-constructed display represents an optimally built display and holder of merchandise.

In practice, the at least two customer-selected merchandising displays form a point of sale unit. A point of sale unit herein may comprise from between about two to about twelve customer-selected merchandising displays. The point of sale unit may be shipped as a whole unit for later display in a store or other venue for sale.

In another embodiment herein, the invention provides an automated method of assembling a customer-predicting merchandising display for selling goods. The steps of the method comprise, at least in part, designing a customized order based upon fore known criteria and data; constructing at least two customizable cartridges (or cartridge) for the order; assigning at least two types of suitable merchandise to each cartridge specific to the order; designing the customer-predicting merchandising display; assembling at least two cartridges into the customer-predicting merchandising display; and shipping the customer-selected merchandising display intact to the venue.

The automated method of assembling a customer-selected merchandising display further comprises the step of scheduling delivery of the customer-selected merchandising display.

In most preferred practice herein, the customer-predicting merchandising display is a stand alone display. The stand alone display, once constructed, can be shipped to a venue or store and placed upright therein in any suitable location of the venue. It is specifically constructed and designed by automation to occupy floor space without taking away precious self space.

In the automated method of assembling a customer-predicting merchandising display herein the customer-predicting merchandising display contains between about two to about one-hundred cartridges. The customer-predicting merchandising display is built according to the requests and requirements of the customer which can be one venue or store or many stores. Once constructed, the assembled customer-predicting merchandising display is transportable in whole after assembly.

In the automated method of assembling a customer-predicting merchandising display, at least two types of suitable merchandise are assigned to each cartridge by predictive algorithm. The algorithm selects merchandise for placement based upon at least one of the following kinds of data: past sales data, seasonal velocity data, non-seasonal velocity data, geography, and demographics. Additional criteria may also be used within the predictive algorithm. Selected merchandise can be at least two or more, pre-packaged and of many types.

The customer-predicting merchandising display herein is preferably designed by a display construction algorithm to produce an optimal geometric configuration. The display construction algorithm measures the amount of merchandise used, the number of cartridges projected and then digitally builds the merchandising display for later automated construction upon, preferably, a robotic assembly line.

The display construction algorithm herein designs the customer-predicting merchandising display based upon factors including but not limited to decreased packaging costs, decreased labor costs, increased pallet density, decreased transportation costs, and decreased printing costs. The display construction algorithm uses all of these factors and more to properly design and then later cause to be built a stand-alone display that is also filled with optimal merchandise. The algorithm-constructed display represents an optimally built display and holder of merchandise.

In practice, the at least two customer-predicting merchandising displays forms a point of sale unit. A point of sale unit herein may comprise from between about two to about twelve customer-predicting merchandising displays. The point of sale unit may be shipped as a whole unit for later display in a store or other venue for sale.

Another embodiment of the invention herein provides for a system of customer-selected merchandising display for selling products and good. The system comprises a merchandise ordering system; a goods receiving system; a cartridge construction system; a merchandise decision system for filling each cartridge; a merchandising display design system for precisely designing the merchandising display; a merchandising display assembly system for assembling at least two such cartridges into a merchandising display; and a shipping system for shipping the merchandising display intact to a venue (e.g., a store).

Yet another embodiment of the invention herein provides a system of assembling a customer-predicting merchandisable display for selling goods. The system comprises a merchandise ordering system based upon foreknown criteria and data; a goods receiving system; a cartridge construction system; a merchandise decision system for filling each cartridge; a merchandising display design system for precisely designing the merchandising display; a merchandising display assembly system for assembling at least two such cartridges into a merchandising display; and a shipping system for shipping the merchandising display intact to a venue.

FIG. 1 illustrates a free-standing modular display 10 (i.e., merchandising display) that includes a modular riser 12 holding a plurality of display towers (e.g., display towers 100a, 100b, 100c). Each display tower is constructed in accordance with an embodiment of the present invention. Each of the display towers 100a-c includes a plurality of cartons 110 held together by a wrap 150 (see FIG. 5) having two side walls and a back wall that are adhered to the outer surfaces of cartons 110. Wrap 150 is sufficiently rigid to provide lateral and vertical support to cartons 110 and prevent them from falling out of modular display 10.

The cartons 110 of a display tower 100 can be of varying sizes and shapes. Each carton 110 as shown is outwardly positioned to display merchandise placed therein. The orientation of each carton 110 is presented for ease of choice by a consumer and for ready display within display tower 100. Such orientation of each carton 110 also aids in storage and transport of the free-standing modular display 10. Display tower 100 may comprise half-sized cartons, full-size cartons or both depending upon the selection criteria for a specific free-standing modular display 10.

Figure 2A:
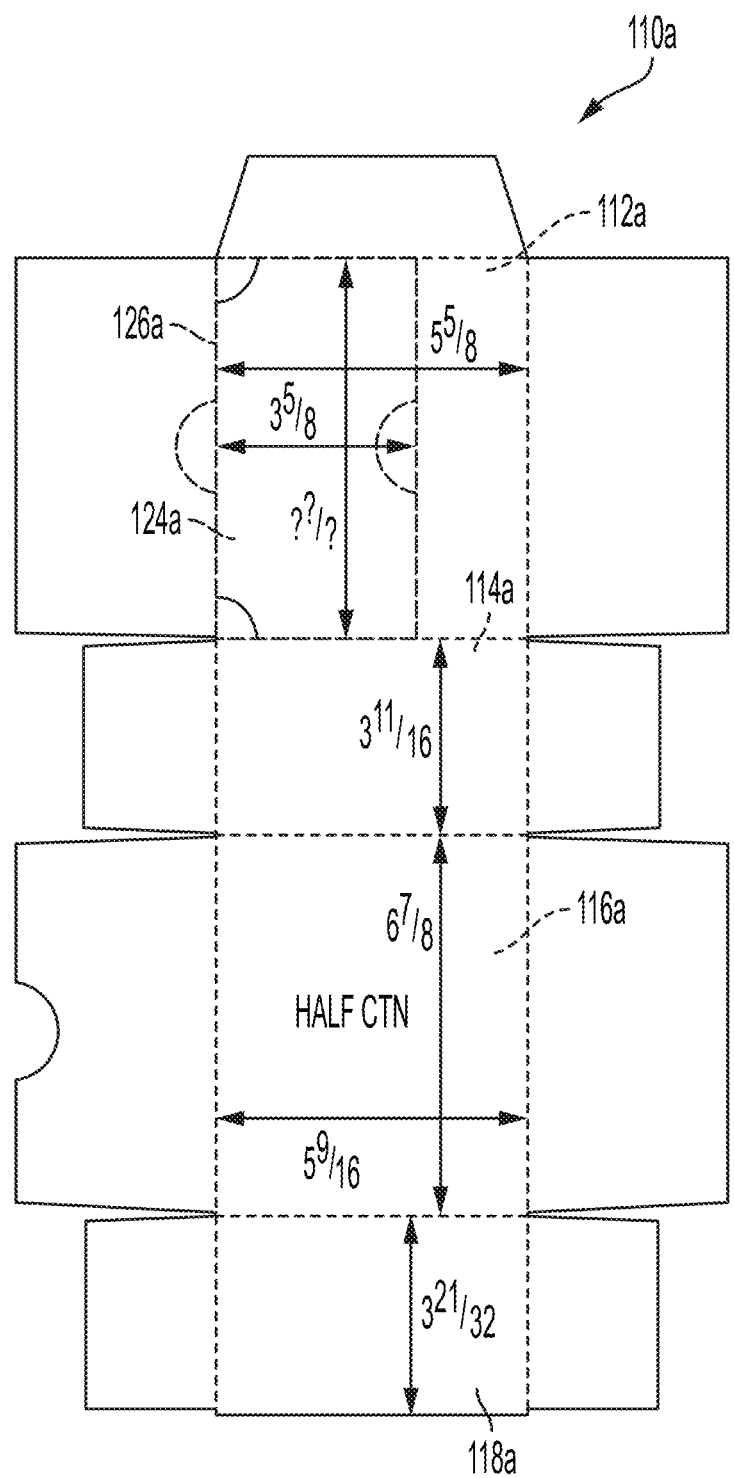
FIG. 2A is a top plan view of a blank of a half-size carton used in constructing the display towers shown in FIG. 1.
Figure 2B:
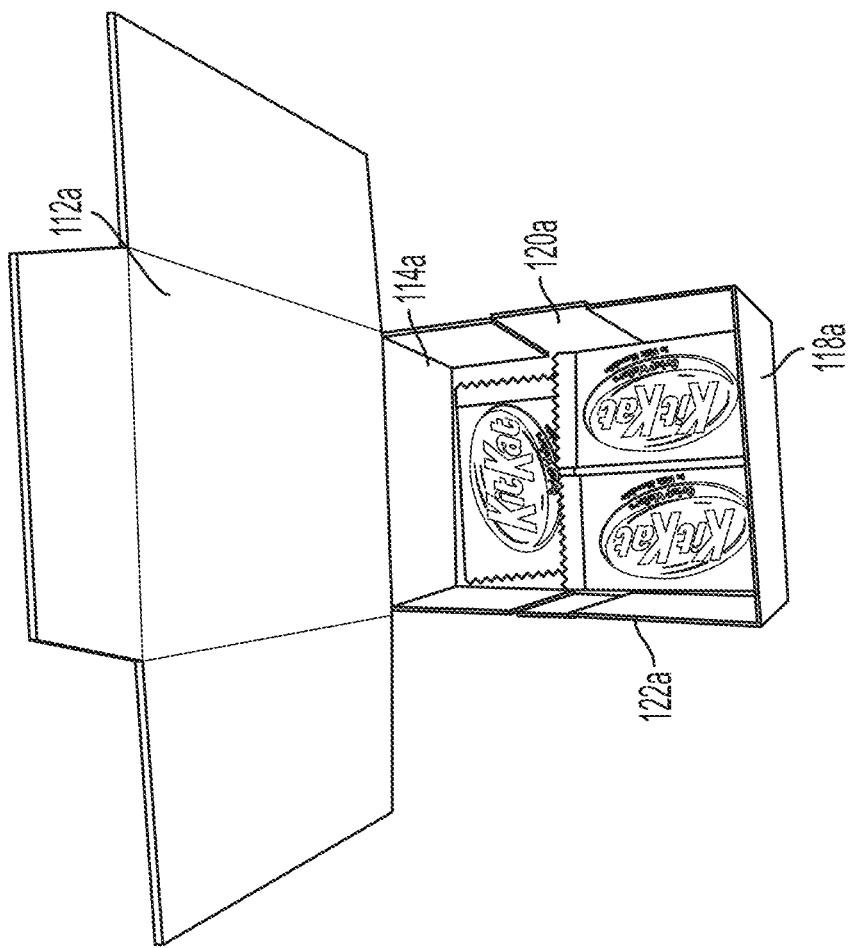
FIG. 2B is a perspective view of the half-size carton shown in FIG. 2A in a partially assembled state.

FIGS. 2A and 2B illustrate a half-size carton 110a cut from a single sheet of material, such as corrugated cardboard or paperboard, and includes a plurality of contiguous panels, including a front panel 112a, a first side panel 114a, a back panel 116a, a second side panel 118a, and major and minor flaps that, when constructed, form top and bottom panels 120a, 122a. The front panel 112a includes a tear-away display panel 124a delineated by a line of weakness 126a formed in the front panel, where removing the tear-away display panel 124a from the front panel 112a creates a window into the interior of the half-size carton 110a and displaying the inside contents thereof.

Figure 3A:
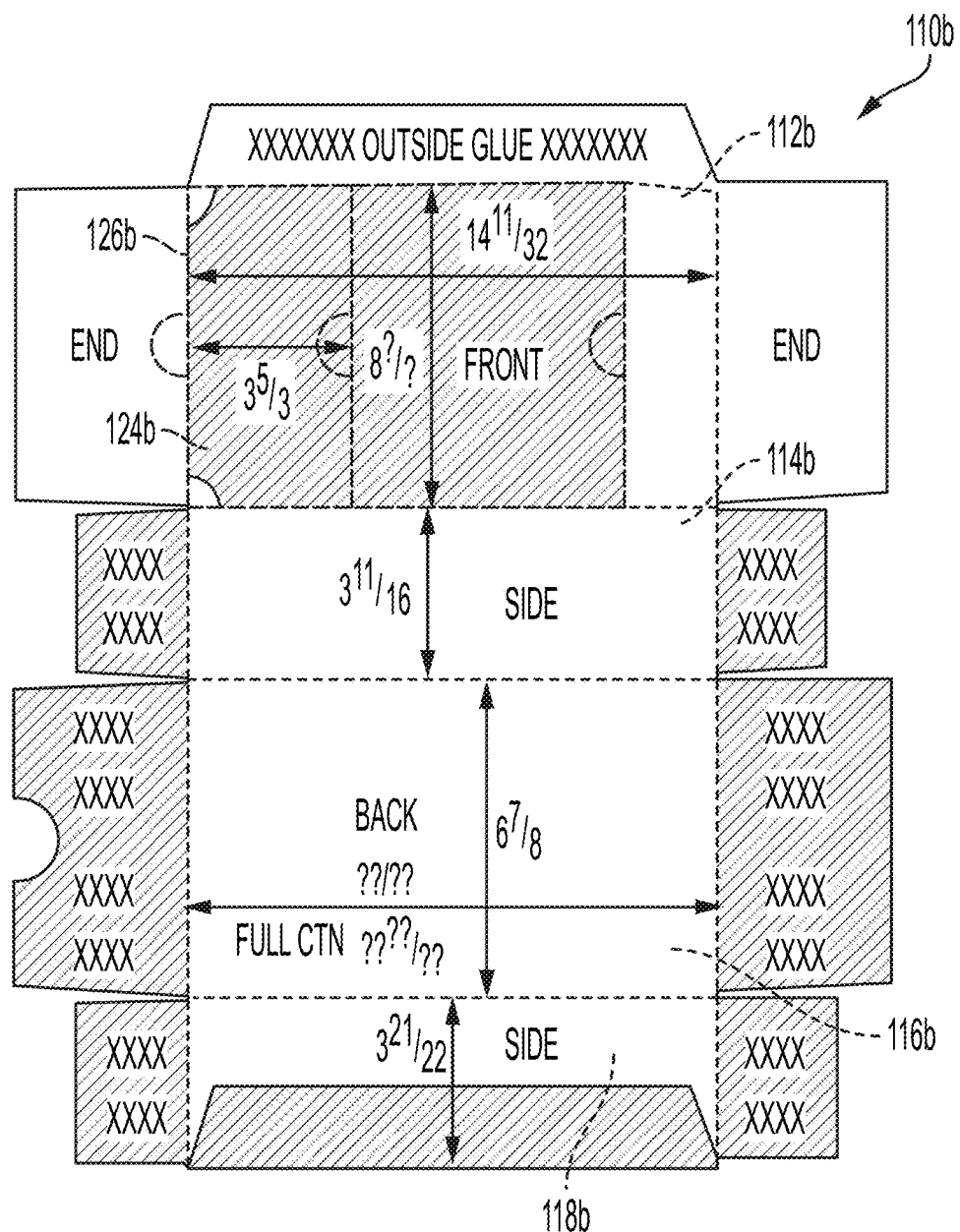
FIG. 3A is a top plan view of a blank of a full-size carton used in constructing the display towers shown in FIG. 1.
Figure 3B:
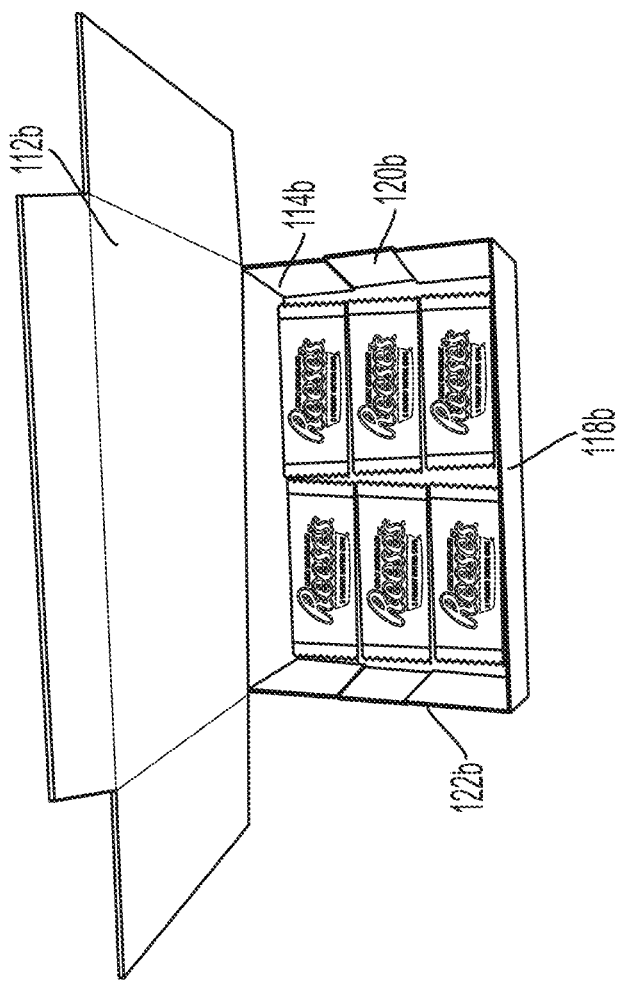
FIG. 3B is a perspective view of the full-size carton shown in FIG. #A in a partially assembled state.

FIGS. 3A and 3B illustrate a full-size carton 110b cut from a single sheet of corrugated cardboard. The full-size carton 110b is constructed similarly to the half-size carton 110a, and the elements illustrated in FIGS. 3A-B which correspond, either identically or substantially, to the elements described above with respect to the half-size carton 110a shown in FIG. 2 have been designated by corresponding reference numbers with the suffix "b."

Figure 4:
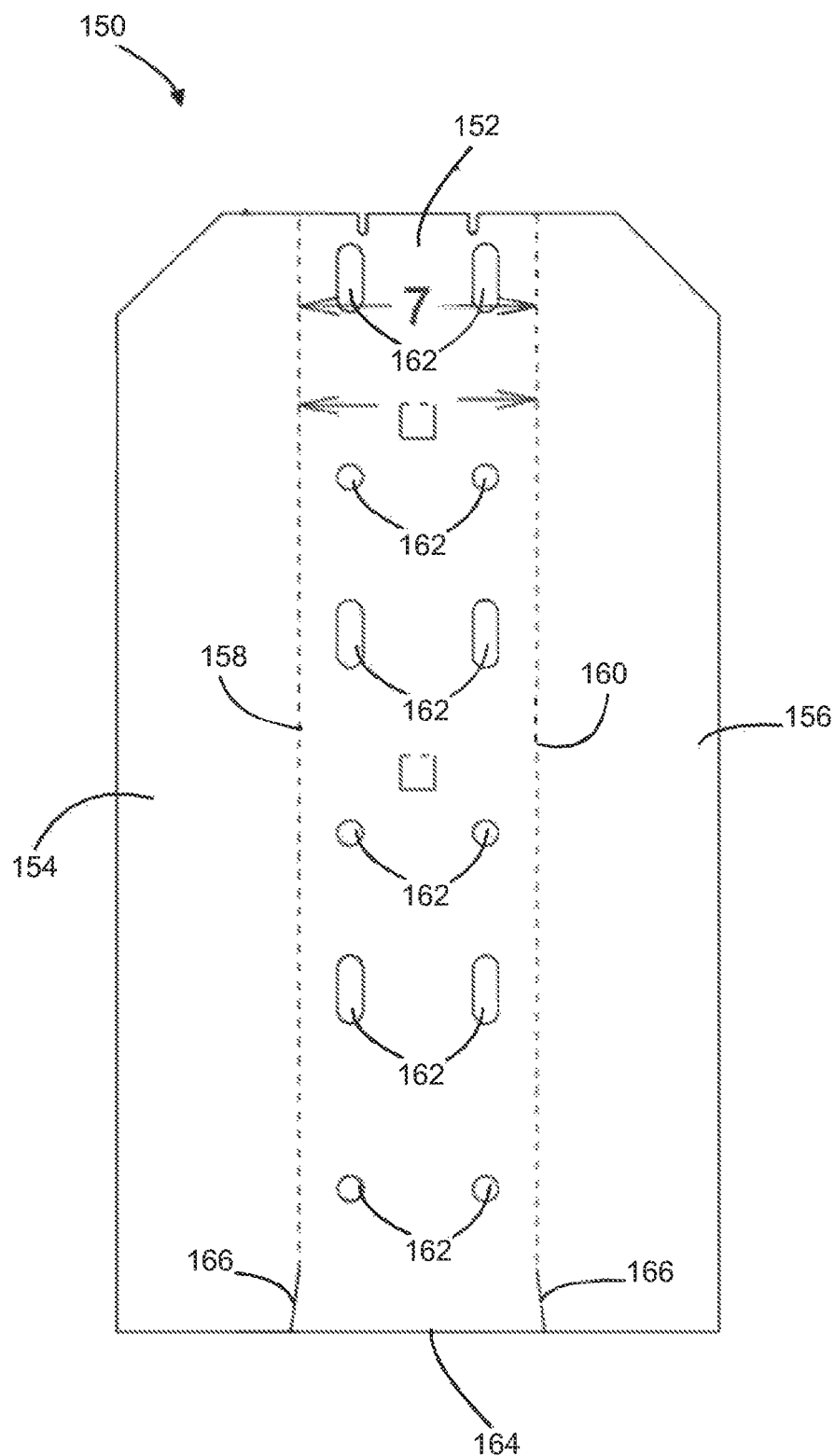
FIG. 4 is a top plan view of a wrap used in constructing one of the display towers shown in FIG. 1.

FIG. 4 illustrates a wrap 150 used with the plurality of cartons 110 in construction of a display tower 100. The wrap 150 includes a back panel 152, a first sidewall panel 154 extending from a first side of the back panel 152, and a second sidewall panel 156 extending from a second, opposite side of the back panel 152. The first and second sidewall panels 154, 156 are integrally connected to the back panel 152 at a first fold line 158 and a second fold line 160, respectively. The back panel 152 includes a plurality of alignment apertures 162 that allow the wrap 150 to be aligned with the operating parts of a jig, as will be discussed in further detail below. The wrap 150 also includes a bottom edge 164 with vent cuts 166 extending inwardly from the bottom edge 164. The vent cuts 166 create a trapezoid-like shape in the bottom edge 164 of the wrap 150 that provides the wrap 150 with vertical stability when the wrap 150 is joined with the cartons 110 to assemble the display tower 100, as discussed in further detail below.

Figure 5:
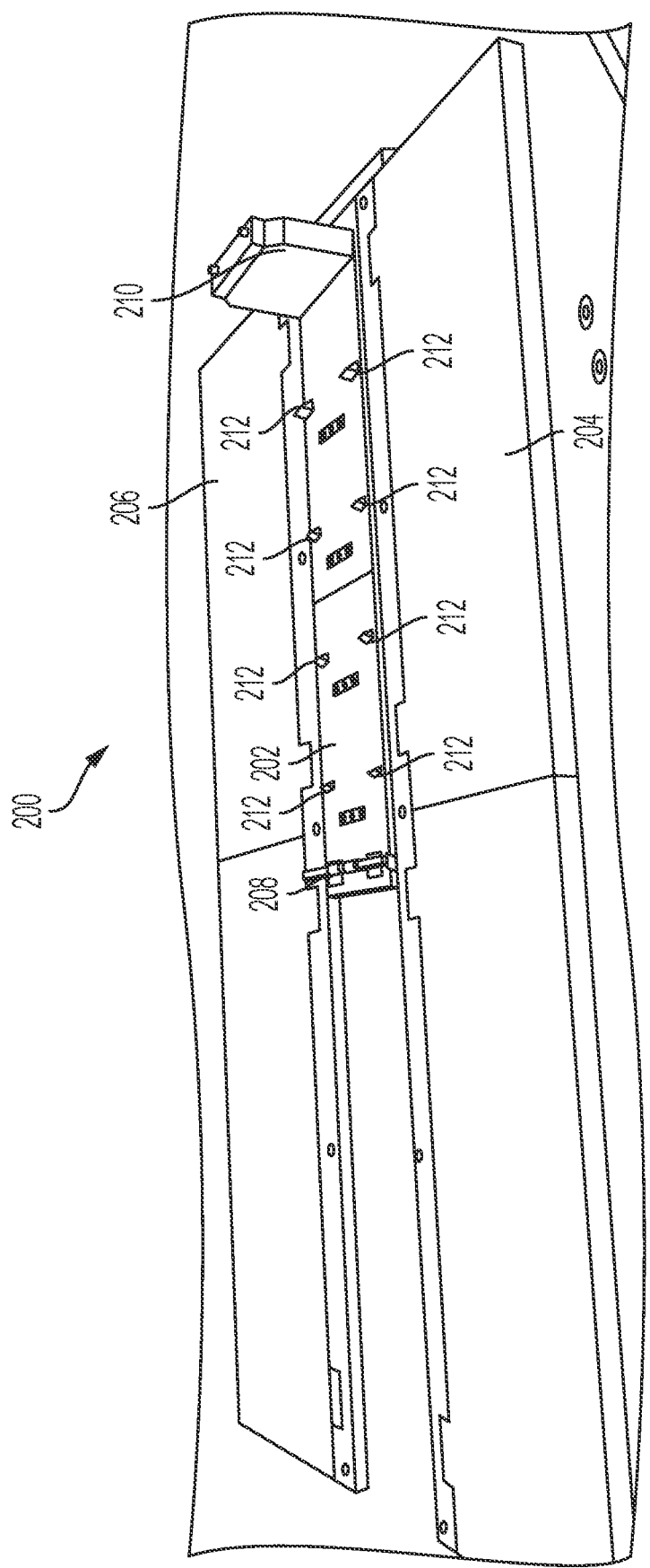
FIG. 5 is a perspective view of a jig used to assemble display towers in accordance with an embodiment of the present invention.

FIG. 5 depicts a jig 200 used to assemble a display tower 100 from its component parts (i.e., the plurality of cartons 110 and the wrap 150). The jig 200 includes a base 202, a first side wing 204 extending from a first side of the base 202, and a second side wing 206 extending from a second, opposite side of the base 202. The base 202 and first and second side wings 204, 206 are sized and shaped to accommodate a wrap 150 such that the back panel 152 is aligned with the base 202, the first sidewall panel 154 is aligned with the first side wing 204, and the second sidewall panel 156 is aligned with the second side wing 206. The base 202 includes a head stop 208 at its upper end and a foot stop 210 at its lower end to prevent the wrap 150 from moving longitudinally beyond the upper and lower ends of the base 202. The first and second side wings 204, 206 are hingedly attached to the base 202 to enable the first and second side wings 204, 206 to fold the first and second sidewall panels 154, 156 inwardly along the first and second fold lines 158, 160, respectively.

The base 202 of the jig 200 includes a plurality of alignment wedges 212 positioned along the sides of the base 202 proximate to the first and second side wings 204, 206. The alignment wedges 212 protrude from the surface of the base 202 and include angled support surfaces for supporting and positioning the plurality of cartons 110 in an angled orientation relative to the surface of the base 202, as discussed in detail below. Each of the alignment wedges 212 corresponds to one of the alignment apertures 162 in the back panel 152 of the wrap 150, and each of the alignment apertures 162 is sized and shaped to receive its corresponding one of the alignment wedges 212.

FIGS. 6-10 illustrate a method of assembling the display tower 100. Referring now to FIG. 6, a wrap 150 is placed upon the jig 200 such that the back panel 152 is aligned with the base 202, the alignment wedges 212 are received in the alignment apertures 162, the first sidewall panel 154 is resting against the first side wing 204, and the second side wall panel 156 is resting against the second side wing 206. Thereafter, a plurality of cartons 110 (see cartons 110a-d) having saleable products are selected and placed on top of the wrap 150 and arranged such that they are layered on top of one another in a slanted orientation relative to the back panel 152 of the wrap 150, as shown in FIG. 7. The slanted orientation of the cartons 110h-k ensures that (1) the removable panels 124h-k are exposed to enable a user to remove them and expose the contents of the cartons 110h-k when the display tower 1005 is put to use; and (2) the contents of the cartons 110h-k remain inside the cartons 110h-k when the display tower 100 is put to use.

Figure 8:
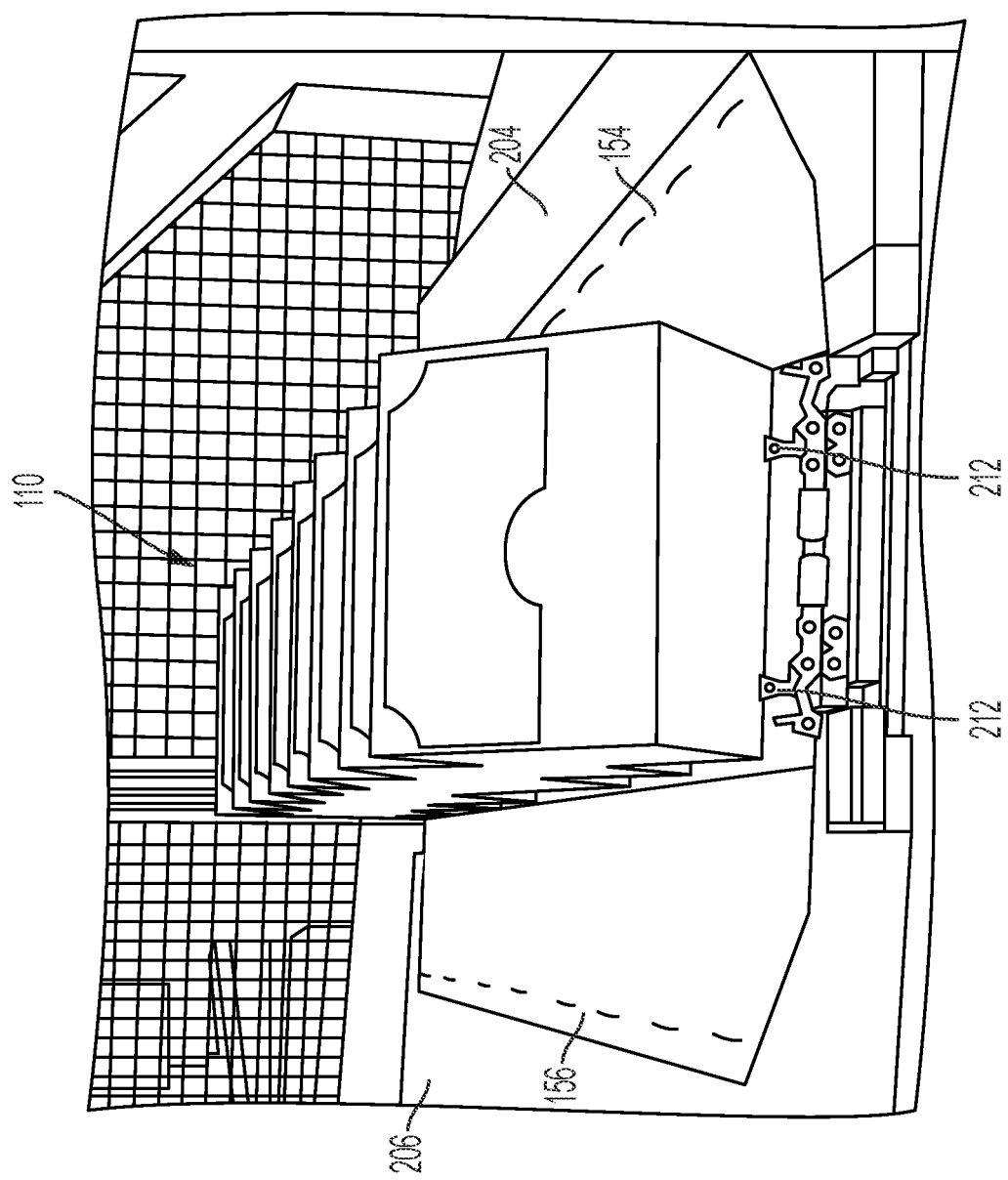
FIG. 8 is a front perspective view of the cartons, wrap, and jig shown in FIG. 7.
Figure 9:
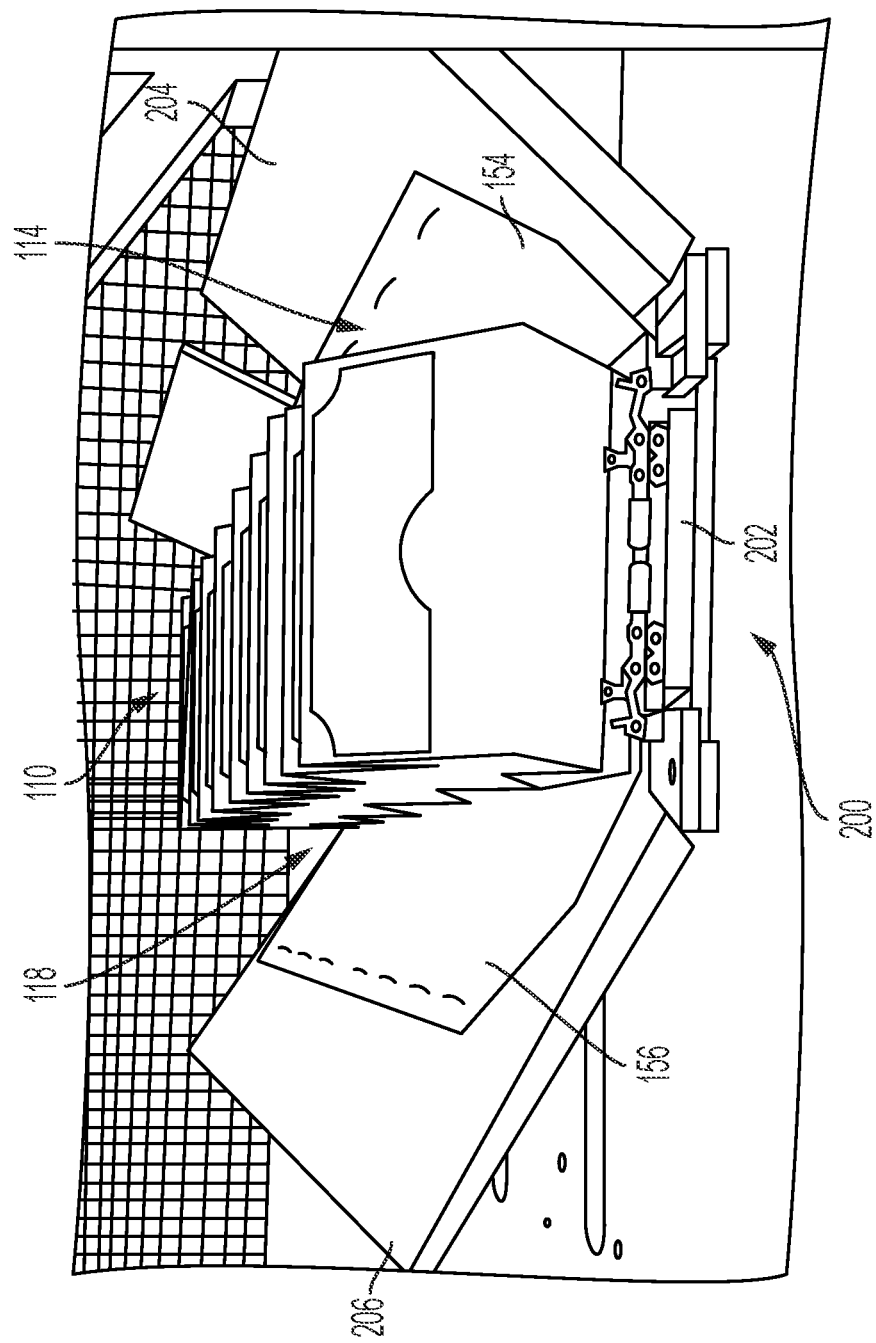
FIG. 9 is the view of FIG. 8 with the sidewall panels of the jig in the process of assembling the display tower.

Referring now to FIGS. 8 and 9, once the cartons 110 have been positioned on the jig 200 with the wrap 150, the first and second sidewall panels 154, 156 are dressed with adhesive. The first and second side wings 204, 206 are then rotated about their hinged connections to the base 202, causing the first and second sidewall panels 154, 156 to rotate about fold lines 158, 160, respectively, until the first and second sidewall panels 154, 156 are abutting the first and second side panels 114, 118 of the cartons 110. The first and second side wings 204, 206 apply compressive force to the first and second sidewall panels 154, 156 to ensure that the adhesive thereon adheres to the first and second side panels 114, 118 of the cartons 110, thereby securing the first and second sidewall panels 154, 156 to the first and second side panels 114, 118, respectively.

Figure 10:
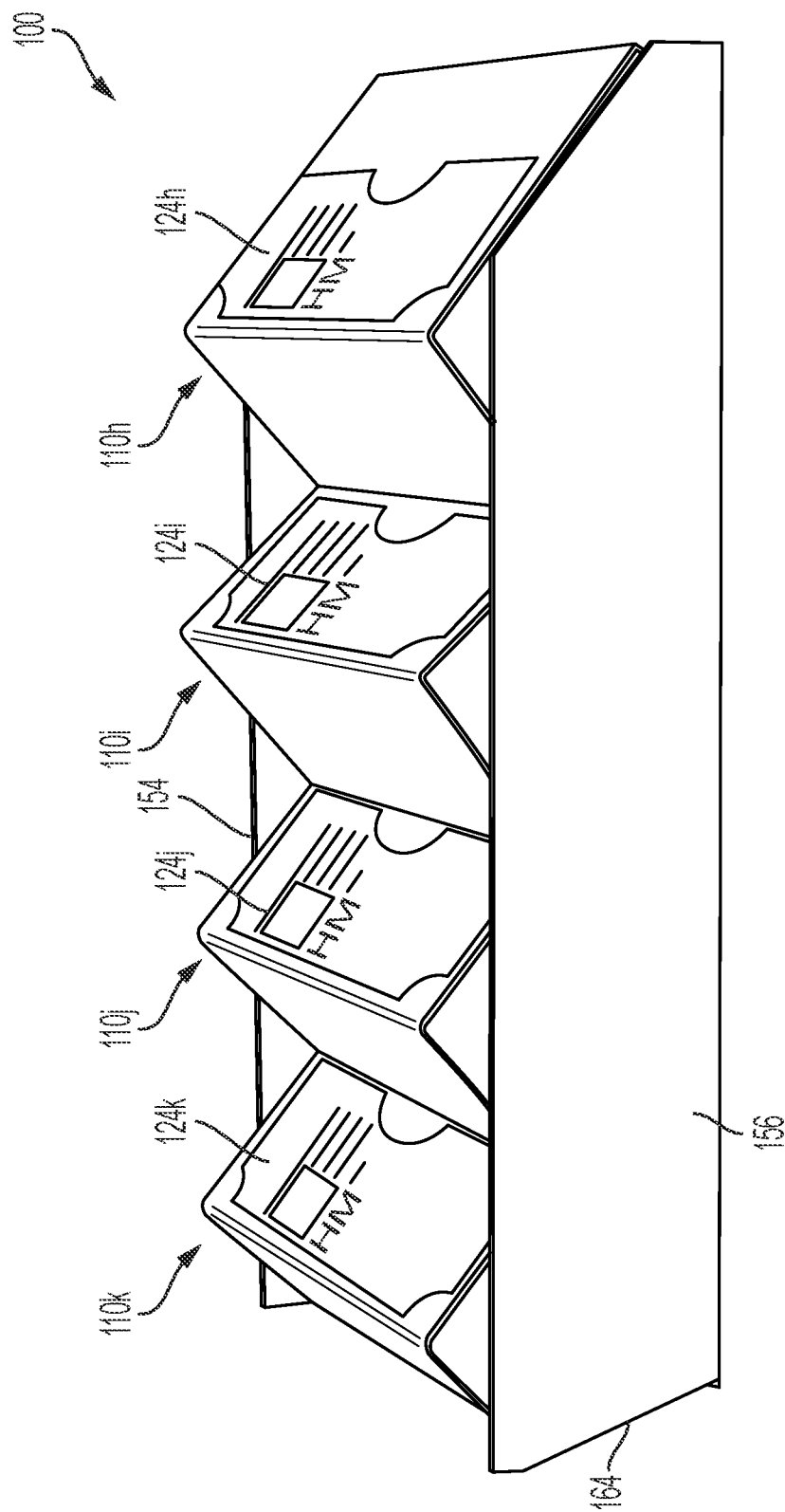
FIG. 10 is a side perspective view of an assembled display tower constructed in accordance with an embodiment of the present invention.

FIG. 10 shows a resulting display tower 100, which can be oriented vertically such that the display tower stands on its bottom edge 164 on a standing surface, such as a riser 12.

Figure 11:
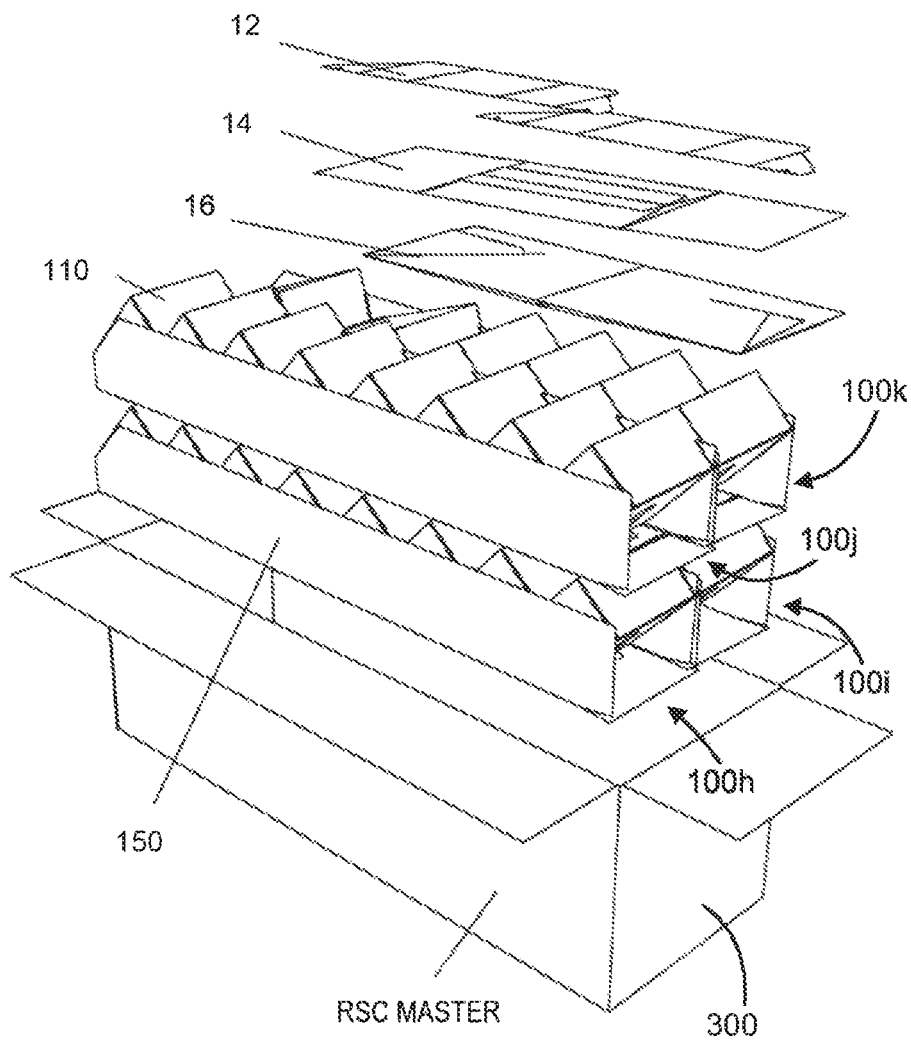
FIG. 11 is a schematic view of a plurality of display towers constructed in accordance with an embodiment of the present invention being loaded into a shipping container.

FIG. 11 depicts a shipping container 300 for holding one or more display towers (e.g., display towers 100h-k) along with one or more of a riser 12, a platform 14, and a base 16 that a user may use to construct a modular display 10, such as the display shown in FIG. 1.

Figure 12:
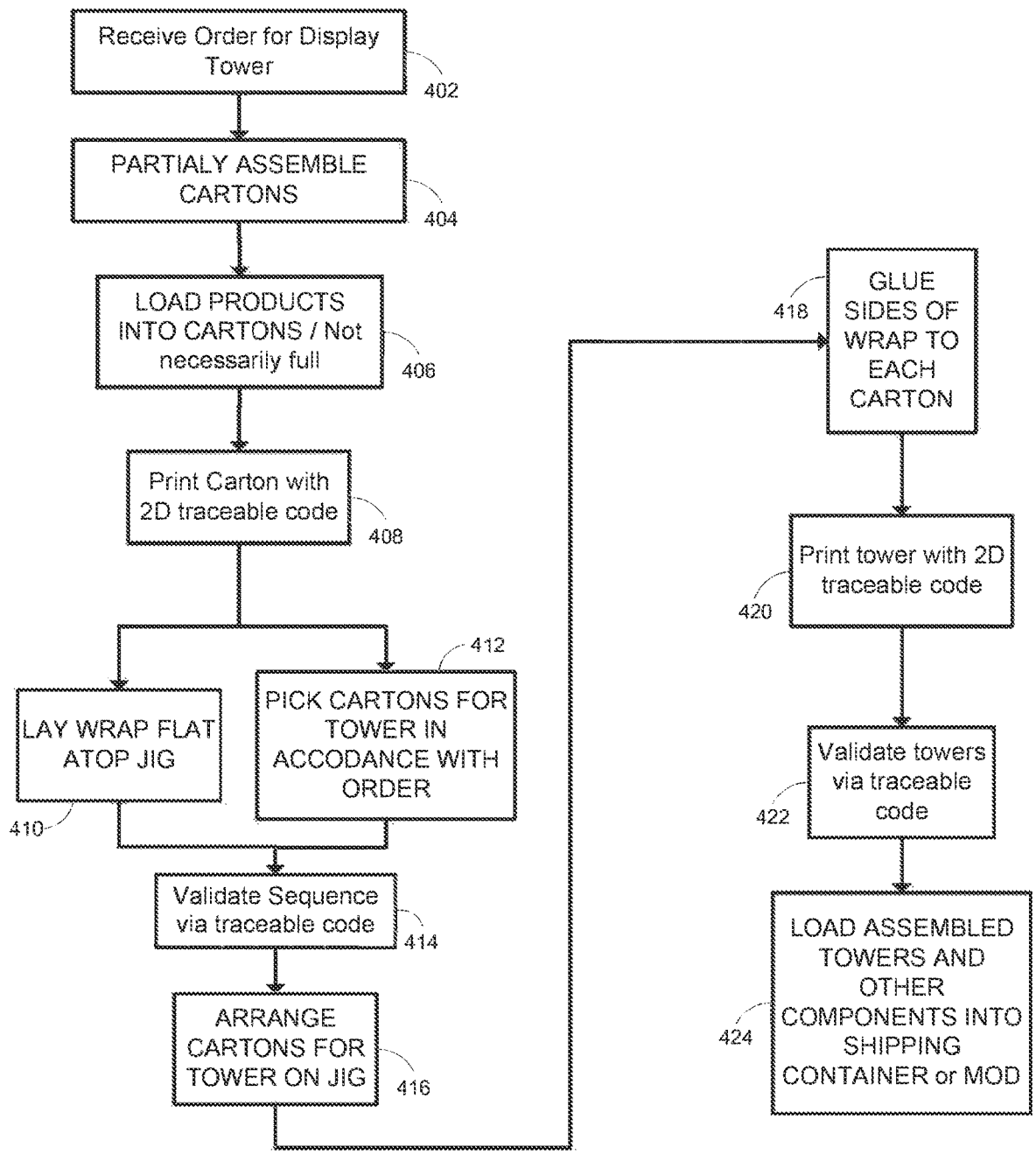
FIG. 12 is a flow chart illustrating the steps of assembling a display tower in accordance with an embodiment of the present invention.

FIG. 12 shows a more detailed method 400 of assembling a display tower 100. The method 400 begins with receiving an order, either directly from a customer or through a planned product distribution, for one or more display towers (step 402). Once the order is received, the requisite cartons 110 needed to fulfill the order are selected and partially constructed (step 404). In one embodiment, partially constructing a carton 110 includes assembling the cartons such that five sides are constructed, with the sixth side remaining open. Saleable products are then loaded into the cartons in accordance with 5 the order received (step 406). In one embodiment, loading saleable products into the cartons includes loading the cartons only partially with saleable products in accordance with the requirements of the received order. Once the cartons 110 have been sufficiently loaded with saleable product, each of the cartons 110 has a traceable code printed thereon (step 408), allowing the cartons 110 to be tracked during the tower assembly process 400 and thereafter.

Figure 13:
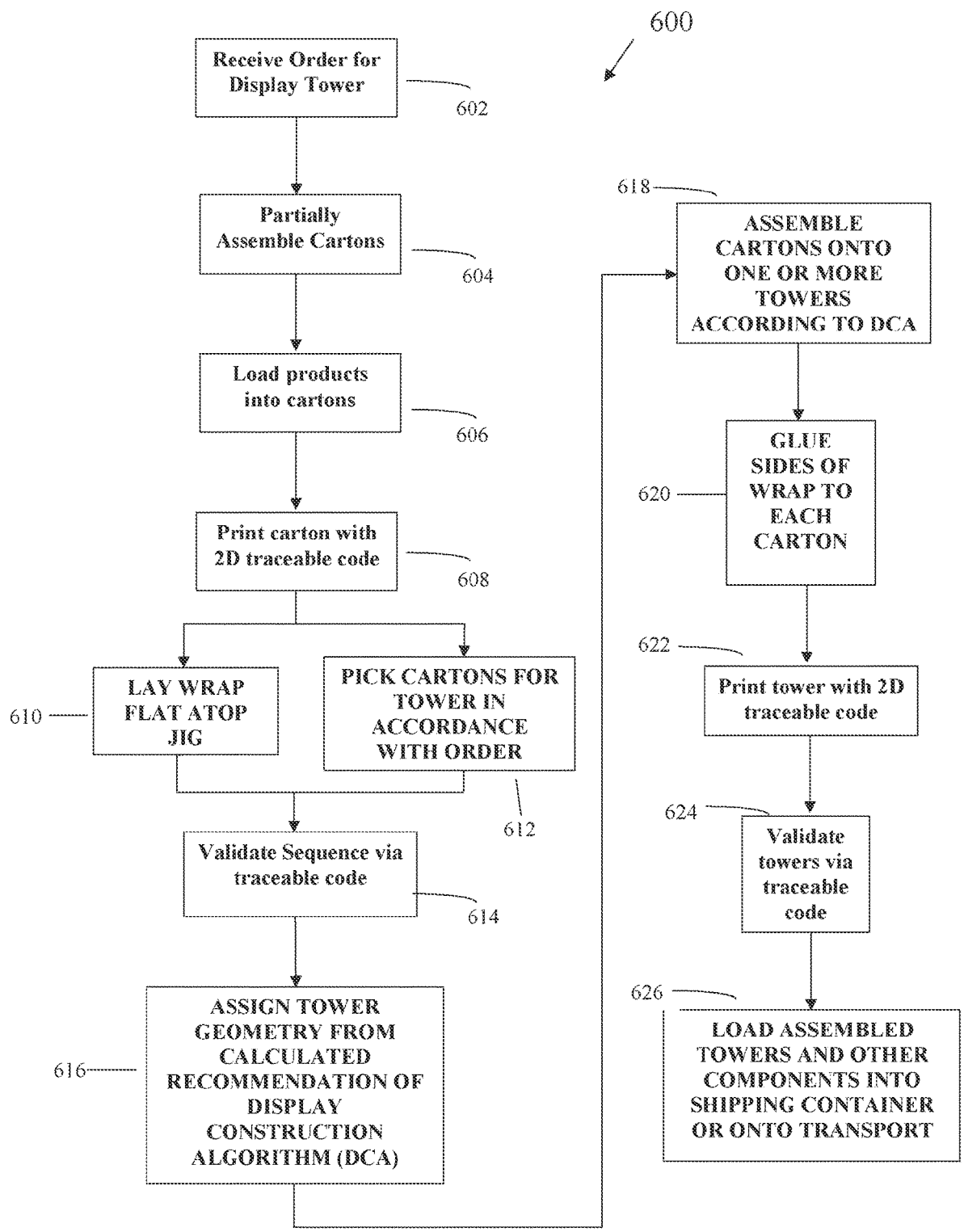
FIG. 13 is a flow chart illustrating the steps of assembling a display tower in accordance with another embodiment of the present invention.

FIG. 13 shows a more detailed method 600 of assembling a display tower 100. The method 600 begins with receiving an order, either directly from a customer or through a planned product distribution, for one or more display towers (step 602). Once the order is received, the requisite cartons 110 needed to fulfill the order are selected and partially constructed (step 604). In one embodiment, partially constructing a carton 110 includes assembling the cartons such that five sides are constructed, with the sixth side remaining open. Saleable products are then loaded into the cartons in accordance with 5 the order received (step 606).

In one embodiment herein, loading saleable products into the cartons includes loading the cartons only partially with saleable products in accordance with the requirements of the received order. Once the cartons 110 have been sufficiently loaded with saleable product, each of the cartons 110 has a traceable code printed thereon (step 608), allowing the cartons 110 to be tracked during the tower assembly process 600 and thereafter.

This embodiment comprises two additional steps: step 616—assign tower geometry from calculated recommendation of display construction algorithm (DCA); and step 618—assemble cartons onto one or more towers according to the DCA. As has been noted hereinabove, the customer-predicting merchandising display herein is preferably designed by a display construction algorithm to produce an optimal geometric configuration. The display construction algorithm measures the amount of merchandise used, the number of cartridges projected and then digitally builds the merchandising display for later automated construction upon, preferably, a robotic assembly line.

The display construction algorithm herein designs the customer merchandising display 100 based upon factors including but not limited to decreased packaging costs, decreased labor costs, increased pallet density, decreased transportation costs, and decreased printing costs. The display construction algorithm uses all of these factors and more to properly design and then later cause to be built a stand-alone display 100 that is also filled with merchandise. The algorithm-constructed display represents an optimally built display and holder of merchandise.

Display 100 geometry is critical for an embodiment herein. The proper display 100 geometry aids in savings and efficiencies for packing, transport and cost savings. The produced geometry by the display construction algorithm (DCA) could conceivably be done manually. However, such a manual approach re-introduces cost, material, and inefficiencies back into the methods and systems herein which, preferably, is fully automated or substantially automated. Therefore, manual calculation of display 100 geometry is not preferred and in fact would defeat the automated (or substantially automated) preferred operation the methods and systems herein.

In practice, an order is received at step 602. The order is of the standard kind created by a store, chain or other venue. Persons of skill in the art are well acquainted with such order types. The order is then recorded, preferably electronically, within the system (or method therefor) and cartons 110 are then partially assembled at step 604. Once constructed, products are loaded into cartons 110. Preferably, at least one such carton 110 is affixed with a 2D traceable code at step 608. At step 610, a wrap is laid flat atop the jig 200 used to assemble display towers 100. Also, cartons 110 are picked for display tower 100 in accordance with the received order in step 612.

To ensure proper carton formation, each with the 2D traceable code is validated by an electronic reader for such code types (e.g., QR codes, barcode, and the like). The information generated from the 2D traceable code validation is then electronically checked against a list stored in one more databases. In step 616 the display construction algorithm (DCA), the display tower geometry calculated from the recommendation of the DCA is assigned. After that assignment, step 618 provides for the assembly of cartons 110 onto one or more display towers 100.

Once combined, the wraps of each carton are glued so as to fixedly attach the two or cartons together in step 620. At assembly of the display tower 100 with cartons 110, another 2D traceable code is affixed thereto. The constructed display tower's 2D traceable code is validated in step 624 by another electronic reader for such code types (e.g., QR codes, barcode, and the like). Once one more display towers 100 are fully constructed, each is loaded into a shipping container and/or onto a transport in step 626.

Figure 14:
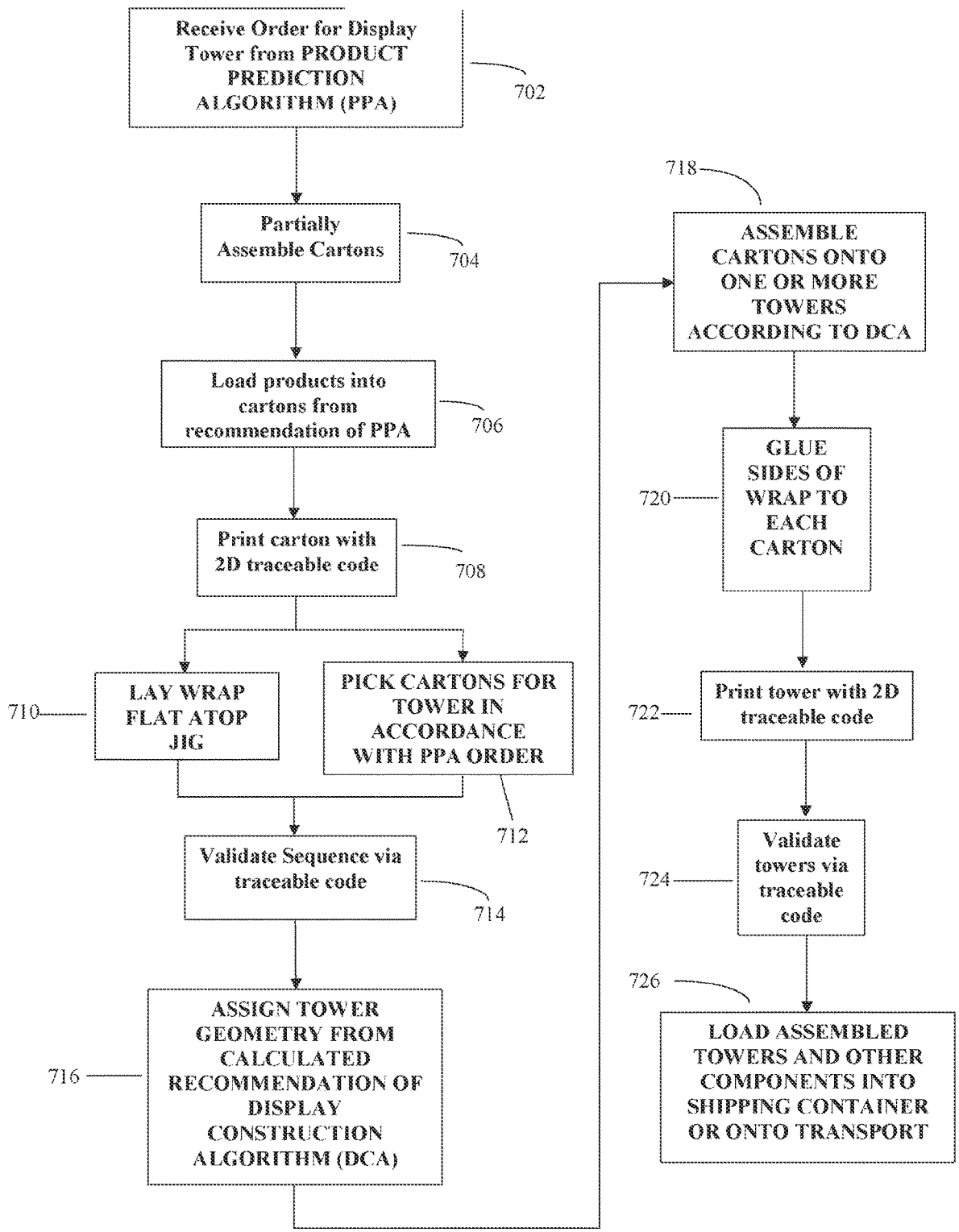
FIG. 14 is a flow chart illustrating the steps of assembling a display tower in accordance with yet another embodiment of the present invention.

The embodiment of FIG. 14 provides an alternative process 700 of the invention herein. It comprises at least one and alternatively two additional steps: i.e., step 702—Receive Order for Display Tower from product prediction algorithm (PPA); step 716—calculate tower geometry from calculated recommendation of display construction algorithm (DCA); and step 718—assemble cartons onto one or more towers according to the DCA. As has been noted hereinabove, the customer-predicting merchandising display herein is preferably designed by a display construction algorithm to produce an optimal geometric configuration. The display construction algorithm measures the amount of merchandise used, the number of cartridges projected and then digitally builds the merchandising display for later automated construction upon, preferably, a robotic assembly line.

In practice, an order is created at step 702. The order is formed from a product prediction algorithm (PPA) that assembles a digital order based upon multiple criteria including, but not limited to all of the following: past sales data, seasonal velocity data, non-seasonal velocity data, geography, demographics, raw material sourcing and more. Additional criteria may also be used within the predictive algorithm. Selected merchandise can be at least two or more, pre-packaged and of many types. In fact, the predictive algorithm can assign a score to eligible merchandise thereby providing an operator a choice of which merchandise to select given the score.

The scoring criteria for merchandise herein is creatable by one who uses the described methods and systems herein. Such criteria is particularized based upon the kind of merchandise being scored. A person of skill in the area of a subject merchandise type, will know which criteria should be included, how criteria is to be weighted and ultimately what a score for subject merchandise means.

Once created by the PPA, the order is then recorded, preferably electronically, within the system (or method therefor) and cartons 110 are then partially assembled at step 704. Once constructed, products are loaded into cartons 110. Preferably, at least one such carton 110 is affixed with a 2D traceable code at step 708. At step 710, a wrap is laid flat atop the jig 200 used to assemble display towers 100. Also, cartons 110 are picked for display tower 100 in accordance with the received order in step 712.

To ensure proper carton formation, each with the 2D traceable code is validated by an electronic reader for such code types (e.g., QR codes, barcode, and the like). The information generated from the 2D traceable code validation is then electronically checked against a list stored in one more databases. In step 716 the display construction algorithm (DCA), the display tower geometry calculated from the recommendation of the DCA is assigned. After that assignment, step 718 provides for the assembly of cartons 110 onto one or more display towers 100.

Once combined, the wraps of each carton are glued so as to fixedly attach the two or cartons together in step 720. At assembly of the display tower 100 with cartons 110, another 2D traceable code is affixed thereto. The constructed display tower's 2D traceable code is validated in step 724 by another electronic reader for such code types (e.g., QR codes, barcode, and the like). Once one more display towers 100 are fully constructed, each is loaded into a shipping container and/or onto a transport in step 726.

FIGS. 15A and 15B show two embodiments of a modular display: a dual tower display 20 and an elevated tower display 30. As seen in FIG. 13A, the dual tower display 20 features two display towers 100e, 100f positioned side-by-side with a sign head 26 positioned on top of the display towers 100e, 100f and spanning their collective width. The display towers 100e, 100f are collectively free-standing on their bottom edges 164e, 164f. With reference to FIG. 13B, the elevated tower display 30 includes a single display tower 100g having a sign head 36 positioned 5 thereon, the display tower 100g positioned on a riser 12g to elevate the display tower 100g above the ground so that the cartons 110 therein are easily within a customer's arm's reach. In both the dual tower display 20 and the elevated tower display 30, the display panels 124e, 124f, 124g of the cartons 110e, 110f, 110g are positioned outwardly toward the front of the display towers 100e, 100f, 100g to enable a customer to view and access the products therein once the display panels 10 124e, 124f, 124g have been removed.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A free-standing modular merchandise display, comprising:
   a plurality of display towers;
   a plurality of cartons arranged on the display towers, the cartons having removable panels; and
   a wrap to hold the plurality of cartons in the display towers in a manner that provides lateral and vertical support to the cartons to prevent the cartons from falling out of the free-standing modular merchandise display, the wrap having a back panel, a first sidewall panel extending from a first side of the back panel for integral connection to the back panel at a first fold line, and a second sidewall panel extending from a second, opposite side of the back panel for integral connection to the back panel at a second fold line,
   wherein the back panel has a plurality of alignment apertures and a bottom edge with vent cuts extending inwardly from the bottom edge to form a shape in the bottom edge that provides the wrap with vertical stability when the wrap is joined with the cartons.

2. The free-standing modular merchandise display of claim 1, wherein each carton in the plurality of cartons are formed from a single sheet of material.

3. The free-standing modular merchandise display of claim 2, wherein the single sheet of material comprises a plurality of contiguous panels that includes a front panel, a first side panel, a back panel, a second side panel, a major flap and a minor flap.

4. The free-standing modular merchandise display of claim 3, wherein the front panel includes a tear-away display panel delineated by a line of weakness formed in the front panel.

5. The free-standing modular merchandise display of claim 4, wherein the tear-away display panel, when removed from the front panel, creates a window into an interior of the carton to facilitate display of contents inside the carton.

6. The free-standing modular merchandise display of claim 3, wherein in an assembled position, the major flap forms a top panel and the minor flap forms a bottom panel.

7. The free-standing modular merchandise display of claim 1, further comprising a modular riser to support the display towers.

\* \* \* \* \*